US005957155A

United States Patent [19]

Lovejoy

[11] Patent Number: 5,957,155
[45] Date of Patent: Sep. 28, 1999

[54] WIRING SYSTEM FOR ELECTRIC ANTI-SIPHON VALVES

[76] Inventor: Thomas A. Lovejoy, 9181 Camden Lake Way, Elk Grove, Calif. 95624

[21] Appl. No.: 09/078,393

[22] Filed: May 13, 1998

[51] Int. Cl.[6] .......... F16K 31/02

[52] U.S. Cl. .......... 137/356; 174/59; 248/229.26

[58] Field of Search .......... 174/37, 59; 248/229.2, 248/229.26; 137/356

[56] References Cited

U.S. PATENT DOCUMENTS

| | | | |
|---|---|---|---|
| 3,009,652 | 11/1961 | McKay . | |
| 3,380,659 | 4/1968 | Seablom . | |
| 3,467,762 | 9/1969 | Boudouris | 174/59 |
| 3,521,332 | 7/1970 | Kramer | 248/229.26 X |
| 3,662,956 | 5/1972 | Hedman . | |
| 3,904,120 | 9/1975 | Sbicca . | |
| 4,114,647 | 9/1978 | Sturman et al. | 137/624.2 |
| 4,212,426 | 7/1980 | Choi . | |

*Primary Examiner*—Gerald A. Michalsky
*Attorney, Agent, or Firm*—Thomas R. Lampe

[57] ABSTRACT

A housing is connected to an electrically-operated anti-siphon valve having solenoid wiring to house the solenoid wiring and control wiring where the wiring is interconnected to protect the wiring from the elements and provide a neat appearance. Wiring clips are located within the housing to connect the solenoid wiring and the control wiring.

7 Claims, 3 Drawing Sheets

12
38B
36
28B
10B 44
44
10A
50
50
50
50
26A
6
6
44
44

12
12
12
10A 50
16
34
54

50
52
34
54
16

WIRING SYSTEM FOR ELECTRIC ANTI-SIPHON VALVES

TECHNICAL FIELD

This invention relates to apparatus for use with an electrically-operated anti-siphon valve having solenoid wiring to connect the solenoid wiring to electric control wiring extending from a location spaced from the anti-siphon valve. More particularly, the wiring is protected from the elements where the solenoid wiring and control wiring are interconnected.

BACKGROUND OF THE INVENTION

Electric anti-siphon valves are in widespread usage to control the flow of water, particularly to outside water sprinklers. Electric anti-siphon valves incorporate electric wires in operative association with a solenoid utilized to control the valve per se. Electric anti-siphon valves are conventionally mounted on an upstanding water supply conduit or "riser."

It is conventional practice to splice or interconnect the wiring extending from the solenoid to controller signal wire leading to a location spaced from the electric anti-syphon valve. To accomplish this, the control wiring extends from the ground upwardly and along the riser to a position closely adjacent to the solenoid wiring. The free ends of the control wiring and the solenoid wiring are then spliced together.

The splices themselves are often taped or covered by splice covers to protect the wiring ends from the elements to some degree but the arrangement is unsightly, vulnerable to damage and relatively ineffective insofar as protecting the wiring from the elements is concerned. The control wiring itself extending along the riser remains exposed to the elements. The control wiring may be taped or otherwise secured to the riser and this too is relatively unsightly. Installation and interconnection of the wiring as described above is time consuming and labor intensive. This new apparatus especially makes removal and renewal of all valve components, including the solenoid, simplified, precise, and fast. Furthermore, involvement of adjacent valve wiring is eliminated.

A number of sprinkler head protectors and shields are shown in prior art patents. The following United States patents illustrate protectors and shields that are believed to be representative of the current state of the prior art in this regard: U.S. Pat. No. 3,009,652, issued Nov. 21, 1961, U.S. Pat. No. 3,662,956, issued May 16, 1972, U.S. Pat. No. 4,212,426, issued Jul. 15, 1980, U.S. Pat. No. 3,380,659, issued Apr. 30, 1968, and U.S. Pat. No. 3,904,120 , issued Sep. 9, 1975. The devices illustrated in the patents do not deal with the problems encountered insofar as interconnection and protection of solenoid wiring and control wiring are concerned.

DISCLOSURE OF INVENTION

This invention relates to apparatus for use with an electrically-operated anti-siphon valve having solenoid wiring to connect the solenoid wiring to electric control wiring extending from a location spaced from the anti-siphon valve.

More particularly, the apparatus incorporates a housing positionable adjacent to an anti-siphon valve and defining a housing interior. The housing also defines at least one opening communicating with the housing interior for receiving solenoid wiring and electric control wiring when the housing is positioned adjacent to an anti-siphon valve. When installed, portions of both the solenoid wiring and the electric control wiring are disposed in the housing interior and are electrically interconnected therein.

The apparatus also includes connector means for connecting the housing to an anti-siphon valve. Wiring connection means is disposed within the housing interior for selectively releasably interconnecting the solenoid wiring and electric control wiring.

Other features, advantages, and objects of the present invention will become apparent with reference to the following description and accompanying drawings.

MODES FOR CARRYING OUT THE INVENTION

Figure 1:
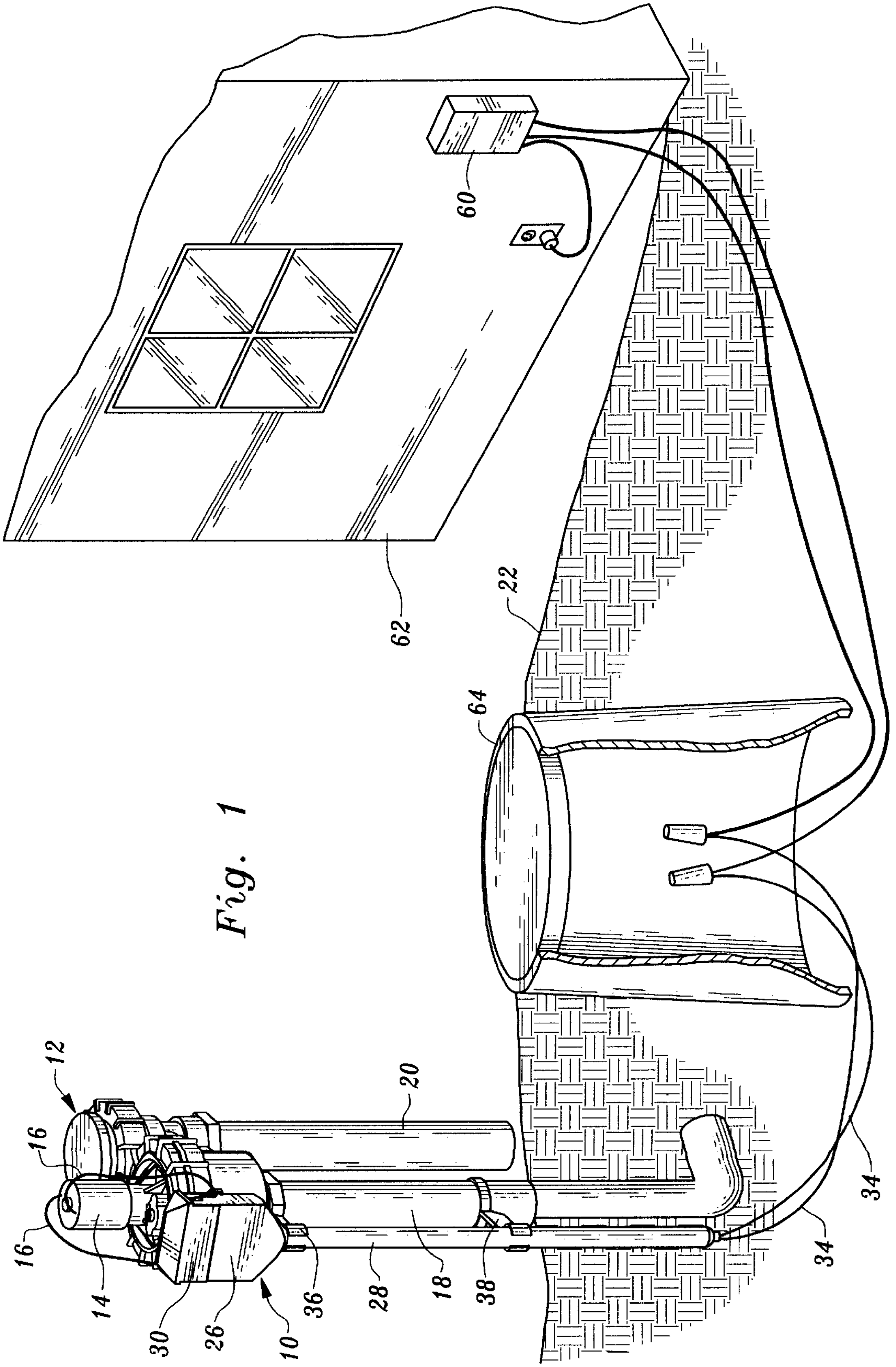
FIG. 1 is a perspective view illustrating apparatus constructed in accordance with the teachings of the present invention connected to an electric anti-siphon valve and associated structure.
Figure 3:
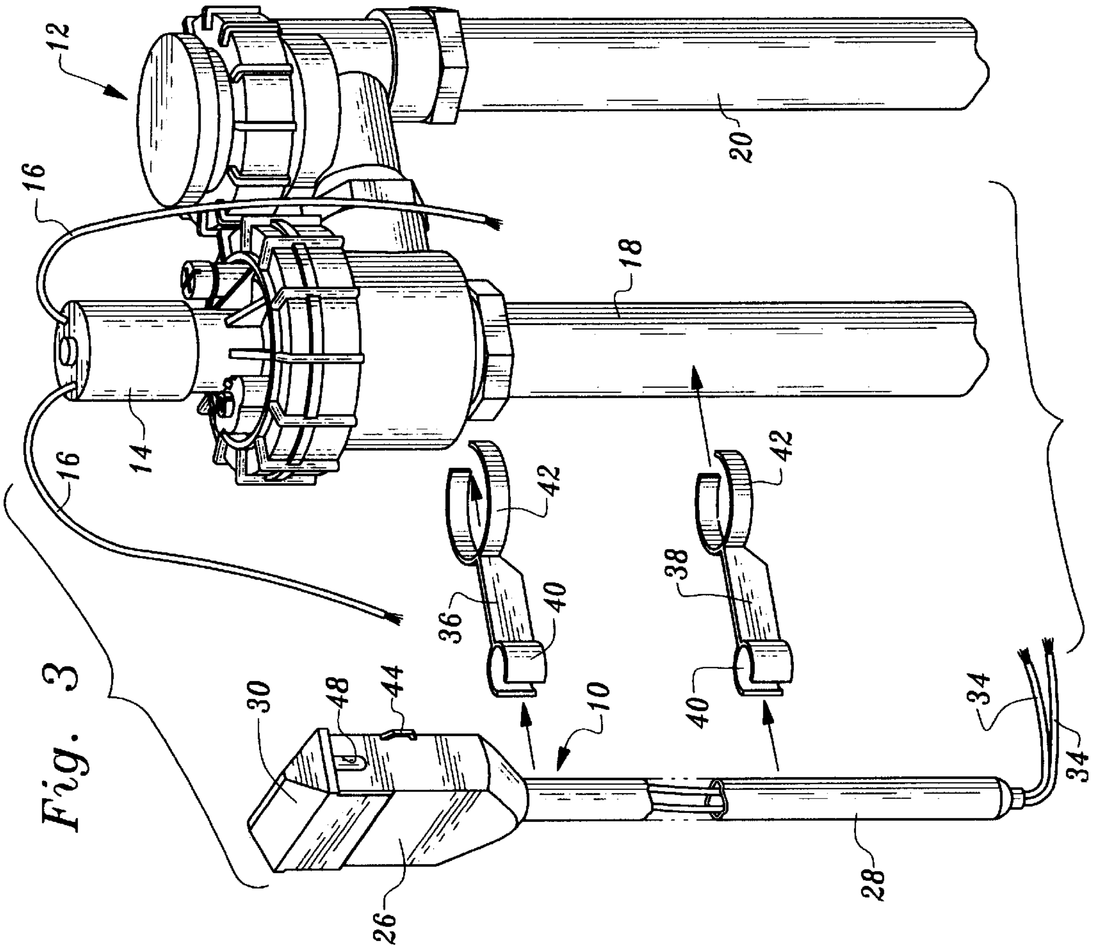
FIG. 3 is a perspective view illustrating the apparatus prior to connection thereof to an electric anti-siphon valve.
Figure 2:
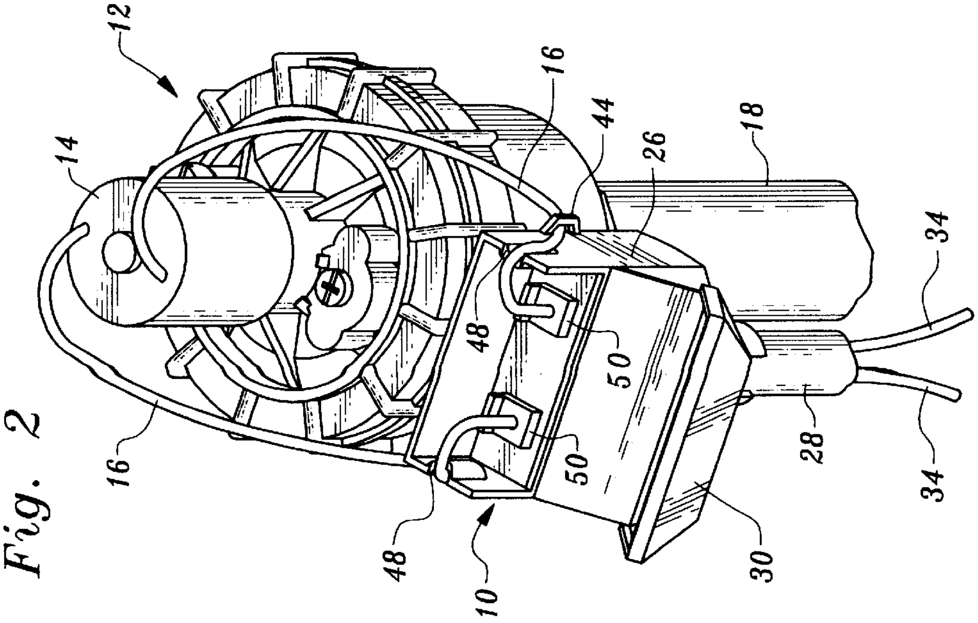
FIG. 2 is a top perspective view illustrating a portion of the apparatus and an associated electric anti-siphon valve with the cover of the apparatus housing in open condition.

Referring now to FIGS. 1–3, apparatus constructed in accordance with the teachings of the present invention is designated by reference numeral 10. In FIGS. 1 and 2 the apparatus 10 is illustrated as actually connected to an electrically-operated anti-siphon valve 12 of conventional construction and incorporating a solenoid 14 having solenoid wiring 16 projecting therefrom. Anti-siphon valve 12 is mounted on two water pipes or conduits 18, 20 which extend to the ground 22.

Apparatus 10 includes a housing comprising a first housing member 26 and a second housing member 28. Housing member 28 is in the form of a pipe or conduit and is hollow and elongated. The interior of box-like first housing member 26 communicates with the interior of the second housing member, thus forming a housing interior extending all the way to and into the ground in the arrangement illustrated.

First housing member 26 includes a hinged cover 30. In FIGS. 1 and 3 the cover 30 is closed and in FIG. 2 the cover is open. An opening is formed at the lower end of second housing member 28 to receive electric control wiring 34. The housing may be formed of any suitable material such as plastic material.

Apparatus 10 is connected to its associated anti-siphon valve by connectors 36, 38 also suitably formed of plastic material. Each connector has two bifurcated ends, ends 40, 42. End 42 is sized and configured to clampingly engage conduit 18, it being understood that the plastic material utilized in the construction of the connectors is flexible, allowing the clamp members or arms of the bifurcated end 42 to yield when positioned into engagement with conduit 18. Similarly, bifurcated end 40 is sized and configured to clampingly engage second housing member 28, with the connector projecting laterally from the second housing member.

Openings 48 are defined by the first housing member 26 for receiving the distal ends of solenoid wiring 16. In the arrangement illustrated, wiring retention members in the form of apertured tabs 44 are located adjacent to the openings 48. In the figures only one such tab 44 is shown, the other being hidden. The distal ends of solenoid wiring 16 are passed through the apertures in tabs 44 and then through openings 48 into the interior of first housing member 26.

Figure 7:
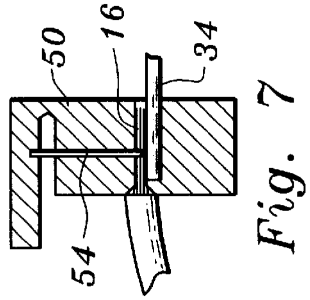
FIG. 7 is a view similar to FIG. 6 but illustrating the ends of solenoid wiring and control wiring in position and electrically interconnected.
Figure 6:
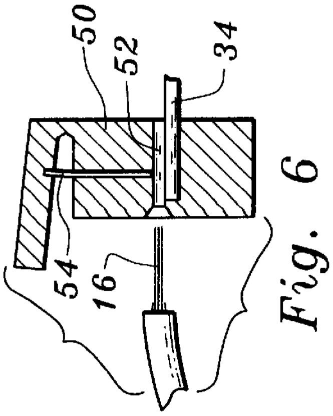
FIG. 6 is an enlarged cross-sectional view taken along the line 6—6 of FIG. 5 and illustrating a wiring retention member and wiring in the process of being positioned therein.

Within the interior of first housing member 26 are mounted wiring connectors or clips 50 which are suitably of conventional construction. FIGS. 6 and 7 may be referred to for details of a suitable conventional wiring connector. In FIG. 6 a distal end of solenoid wiring 16 is shown being placed within a wiring receptacle 52 already accommodating a distal end of control wiring 34. Once the distal ends are in position, a biased connector element 54 clampingly engages the wiring distal ends together to complete the electrical connection therebetween. After the wiring distal ends have been installed and clamped in position the cover 30 is closed.

FIG. 1 illustrates a typical arrangement wherein the control wiring 34 leads to a control box 60 on a house or other structure 62. If desired, a manually accessible receptacle or housing 64 in the ground may be utilized to accommodate splice connections in the control wiring.

FIGS. 4–7 illustrate an alternative form of apparatus which is employed in association with three anti-siphon valves 12. The first housing member 26A of the apparatus is larger than that of the first housing member 26 of previously described apparatus 10. Additionally, six, rather than two, wiring connectors are located in first housing member 26A and six apertured tabs 44 are employed to accommodate the wiring associated with 3 electrically-operated anti-siphon valves.

Figure 8:
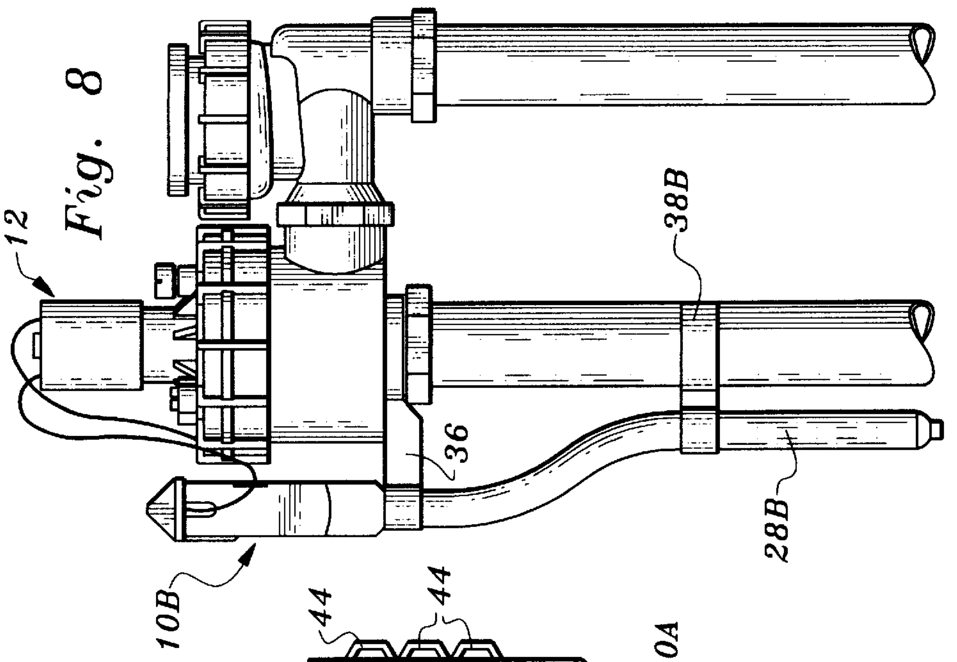
FIG. 8 is an elevational view of a third embodiment of the apparatus connected to an electric anti-siphon valve.
Figure 5:
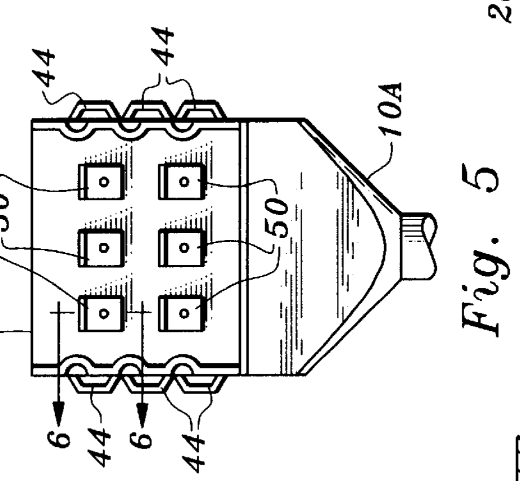
FIG. 5 is a front elevational view illustrating the interior of a portion of the housing thereof in open condition, showing wiring retention members in the housing interior.
Figure 4:
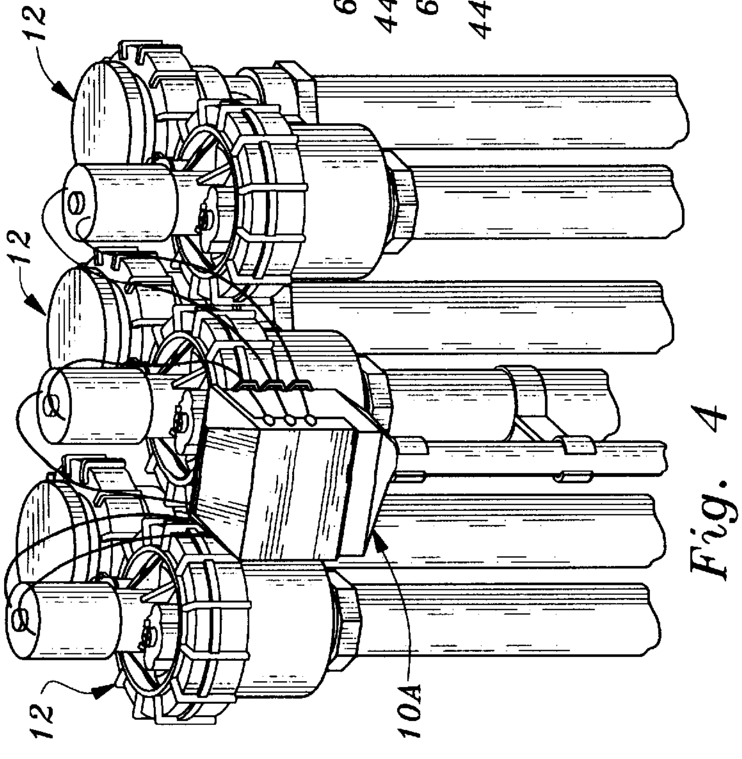
FIG. 4 is a perspective view illustrating a portion of an alternate embodiment of the invention in operative association with three electric anti-siphon valves.

FIG. 8 illustrates another embodiment of the apparatus, apparatus 10B. In this arrangement second housing member 28B has a bend formed therein to form an offset in the apparatus. Otherwise, the configuration of the housing is the same as that of apparatus 10 of the first embodiment described above. To accommodate the bend formed in second housing member 28B, connector 38B is shorter than connector 36.

I claim:

1. Apparatus for use with an electrically-operated anti-siphon valve having solenoid wiring to connect the solenoid wiring to electric control wiring extending from a location spaced from said anti-siphon valve, said apparatus comprising, in combination:

a housing positionable closely adjacent to an anti-siphon valve, said housing defining a housing interior, a first opening communicating with said housing interior for receiving solenoid wiring and a second opening spaced from said first opening communicating with said housing interior for receiving electric control wiring when said housing is positioned closely adjacent to the anti-siphon valve with portions of both said solenoid wiring and said electric control wiring disposed in said housing interior and electrically interconnected within said housing interior;

connector means for releasably connecting said housing to the anti-siphon valve comprising at least one projection projecting from said housing for yieldably receiving a water conduit attached to the anti-siphon valve to releasably connect said housing to the anti-siphon valve, said housing including a first housing member defining said first opening and a second housing member defining said second opening, said second housing member being elongated and extending downwardly from said first housing member alongside the water conduit when said at least one projection is releasably connected to the water conduit by said at least one projection, said second housing member being hollow for accommodating a length of said electric control wiring, and said second housing member defining said second opening, said second opening for receiving said electric control wiring at a location spaced from and disposed below said first housing member, said first housing member including a housing body and a cover selectively movable relative to said housing body upon application of a manual force thereto between a first position wherein said housing interior is open for access by an individual to said housing interior and a second position wherein said housing interior is closed by said cover; and wiring connection means within said housing interior selectively releasably interconnecting said solenoid wiring said electric control wiring within said housing interior to establish an electrical connection therebetween within said housing interior, said wiring connection means being manually accessible by an individual when said cover is in said first position and covered by said cover when said cover is in said second position.

2. The apparatus according to claim 1 wherein said wiring connection means comprises at least one yieldable wiring receiving clip.

3. The apparatus according to claim 1 wherein said at least one projection is connected to said second housing member and extends laterally from the primary axis thereof for connection to the water conduit.

4. The apparatus according to claim 3 wherein said at least one projection includes a bifurcated distal end spaced from said second housing member, said bifurcated distal end comprising a yieldable clamp for yieldably clampingly engaging the water conduit.

5. The apparatus according to claim 4 wherein said bifurcated distal end comprises two flexible clamp members.

6. The apparatus according to claim 1 additionally comprising at least one wiring retention member connected to said housing body adjacent to said first opening for engagement with said solenoid wiring to maintain said solenoid wiring positioned on said housing body.

7. In combination:

an electrically operated anti-siphon valve including solenoid wiring;

a water conduit supporting said anti-siphon valve and extending downwardly therefrom; and apparatus for connecting said solenoid wiring to electric control wiring extending from a location spaced from said anti-siphon valve, said apparatus comprising, in combination:

a housing positioned closely adjacent to said anti-siphon valve, said housing defining a housing interior, a first opening communicating with said housing interior receiving said solenoid wiring and a second opening spaced from said first opening communicating with said housing interior receiving electric control wiring with portions of both said solenoid wiring and said electric control wiring disposed in said housing interior and electrically interconnected within said housing interior;

connector means releasably connecting said housing to said anti-siphon valve comprising at least one projection projecting from said housing yieldably receiving said water conduit and releasably connecting said housing to the anti-siphon valve, said housing including a first housing member defining said first opening and a second housing member defining said second opening, said second housing member being elongated and extending downwardly from said first housing member alongside the water conduit, said second housing member being hollow and accommodating a length of said electric control wiring, and said second housing member defining said second opening, said second opening receiving said electric control wiring at a location spaced from and disposed below said first housing member, said first housing member including a housing body and a cover selectively movable relative to said housing body upon application of a manual force thereto between a first position wherein said housing interior is open for access by an individual to said housing interior and a second position wherein said housing interior is closed by said cover; and wiring connection means within said housing interior releasably interconnecting said solenoid wiring and said electric control wiring within said housing interior to establish an electrical connection therebetween within said housing interior, said wiring connection means being manually accessible by an individual when said cover is in said first position and covered by said cover when said cover is in said second position.

* * * * *